US008805454B2

(12) United States Patent
Sampat et al.

(10) Patent No.: US 8,805,454 B2
(45) Date of Patent: *Aug. 12, 2014

(54) DYNAMICALLY PROVISIONING A DEVICE

(71) Applicant: QUALCOMM Incorporated, San Diego, CA (US)

(72) Inventors: Kuntal D. Sampat, San Diego, CA (US); Samir K. Gupta, San Diego, CA (US); Eddie L. T. Choy, Carlsbad, CA (US); Joel Linsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/903,229

(22) Filed: May 28, 2013

(65) Prior Publication Data
US 2013/0260737 A1 Oct. 3, 2013

Related U.S. Application Data

(63) Continuation of application No. 12/362,098, filed on Jan. 29, 2009.

(51) Int. Cl.
H04B 1/00 (2006.01)
(52) U.S. Cl.
USPC .................. 455/569.1; 455/3.06; 709/231
(58) Field of Classification Search
USPC ......................................... 455/569.1
See application file for complete search history.

(56) References Cited

U.S. PATENT DOCUMENTS

| 5,161,184 | A | 11/1992 | Smith et al. |
| 5,483,586 | A | 1/1996 | Sussman |
| 5,794,141 | A | 8/1998 | Zicker |
| 5,802,460 | A | 9/1998 | Parvulescu et al. |
| 5,928,323 | A | 7/1999 | Gosling et al. |
| 5,930,703 | A | 7/1999 | Cairns |
| 6,032,112 | A | 2/2000 | Onishi et al. |

(Continued)

FOREIGN PATENT DOCUMENTS

| CN | 101286770 A | 10/2008 |
| EP | 0911728 A1 | 4/1999 |

(Continued)

OTHER PUBLICATIONS

Taiwan Search Report—TW099102697—TIPO—Apr. 20, 2013.

(Continued)

Primary Examiner — Hai V Nguyen
(74) Attorney, Agent, or Firm — Espartaco Diaz Hidalgo

(57) ABSTRACT

A wireless communication device comprises a first wireless interface configured to communicate with a device over a first wireless network, and a second wireless interface configured to communicate with a remote server over a second wireless network, the remote server storing one or more executables. The wireless communication device includes a configured to receive device configuration information from the device over the first wireless network, the device configuration information identifying at least processing hardware resources in the device. The controller is configured to select an executable based on the device configuration information, the executable for configuring the device to process data in a particular format and determine whether the selected executable is stored within the wireless communication device, and if not, to retrieve the selected executable from the remote server by way of the second wireless network, and download the selected executable to the device over the first wireless network.

31 Claims, 9 Drawing Sheets

(56) References Cited

U.S. PATENT DOCUMENTS

| | | |
|---|---|---|
| 6,216,152 B1 | 4/2001 | Wong et al. |
| 6,314,565 B1 | 11/2001 | Kenner et al. |
| 6,343,321 B2 | 1/2002 | Patki et al. |
| 6,536,670 B1 | 3/2003 | Postman et al. |
| 6,654,765 B2 | 11/2003 | Wong et al. |
| 6,832,373 B2 | 12/2004 | ONeill |
| 6,892,051 B2* | 5/2005 | Schmitt et al. ............... 455/41.2 |
| 6,909,878 B2 | 6/2005 | Haller et al. |
| 6,941,453 B2 | 9/2005 | Rao |
| 6,970,940 B1 | 11/2005 | Vogel et al. |
| 6,973,333 B1 | 12/2005 | O'neil |
| 6,978,453 B2 | 12/2005 | Rao et al. |
| 6,996,818 B2 | 2/2006 | Jacobi et al. |
| 7,000,002 B2 | 2/2006 | Suzuki et al. |
| 7,000,003 B2 | 2/2006 | Suzuki et al. |
| 7,000,004 B2 | 2/2006 | Suzuki et al. |
| 7,000,005 B2 | 2/2006 | Suzuki et al. |
| 7,054,914 B2 | 5/2006 | Suzuki et al. |
| 7,062,765 B1 | 6/2006 | Pitzel et al. |
| 7,123,140 B1 | 10/2006 | Denes |
| 7,203,940 B2 | 4/2007 | Barmettler et al. |
| 7,233,808 B2 | 6/2007 | Mooney et al. |
| 7,254,372 B2 | 8/2007 | Janusz et al. |
| 7,292,870 B2 | 11/2007 | Heredia et al. |
| 7,386,304 B2 | 6/2008 | Alvarado et al. |
| 7,590,233 B2 | 9/2009 | Chiloyan |
| 7,610,016 B2* | 10/2009 | Schmitt et al. ............... 455/41.2 |
| 7,626,942 B2* | 12/2009 | Klammer ....................... 370/252 |
| 7,634,227 B2 | 12/2009 | de Jong |
| 7,650,170 B2 | 1/2010 | May et al. |
| 7,680,490 B2 | 3/2010 | Bloebaum et al. |
| 7,694,034 B1* | 4/2010 | Breau et al. ...................... 710/16 |
| 7,734,055 B2 | 6/2010 | Chiloyan |
| 7,804,954 B2 | 9/2010 | Han et al. |
| 7,844,963 B2 | 11/2010 | Pitzel et al. |
| 7,853,649 B2 | 12/2010 | Lee et al. |
| 7,877,116 B2 | 1/2011 | Simmons et al. |
| 7,894,808 B2 | 2/2011 | Nakayama et al. |
| 7,894,837 B2 | 2/2011 | Heredia et al. |
| 7,904,579 B2 | 3/2011 | Janik et al. |
| 7,912,020 B2 | 3/2011 | Khasawneh et al. |
| 7,912,728 B2 | 3/2011 | Kong et al. |
| 7,930,273 B1 | 4/2011 | Clark et al. |
| 7,937,125 B2 | 5/2011 | May et al. |
| 7,974,313 B2* | 7/2011 | Kim et al. ..................... 370/486 |
| 8,019,449 B2* | 9/2011 | Barzegar et al. ................ 700/94 |
| 8,045,729 B2 | 10/2011 | Preston et al. |
| 8,108,569 B1* | 1/2012 | Breau et al. ...................... 710/16 |
| 8,126,157 B2 | 2/2012 | Buil et al. |
| 8,135,362 B2* | 3/2012 | LaDue .......................... 455/126 |
| 8,155,335 B2 | 4/2012 | Rutschman |
| 8,171,165 B2* | 5/2012 | Peng et al. ..................... 709/246 |
| 8,199,780 B2 | 6/2012 | Gha et al. |
| 8,244,179 B2 | 8/2012 | Dua |
| 8,295,532 B2 | 10/2012 | Hsu et al. |
| 8,300,079 B2 | 10/2012 | Tian |
| 8,325,930 B2 | 12/2012 | Kim et al. |
| 8,401,004 B2* | 3/2013 | Song et al. ..................... 370/352 |
| 8,412,269 B1 | 4/2013 | Cook |
| 8,532,714 B2 | 9/2013 | Sampat et al. |
| 2001/0025302 A1 | 9/2001 | Suzuki et al. |
| 2002/0009975 A1 | 1/2002 | Janusz et al. |
| 2002/0047902 A1 | 4/2002 | Thomas et al. |
| 2002/0068600 A1 | 6/2002 | Chihara et al. |
| 2003/0020595 A1 | 1/2003 | Wacyk |
| 2003/0045235 A1 | 3/2003 | Mooney et al. |
| 2003/0069048 A1 | 4/2003 | Liu et al. |
| 2003/0109252 A1* | 6/2003 | Prentice et al. ................ 455/418 |
| 2003/0161292 A1 | 8/2003 | Silvester |
| 2003/0185301 A1 | 10/2003 | Abrams et al. |
| 2003/0211830 A1 | 11/2003 | Takimoto et al. |
| 2003/0224770 A1* | 12/2003 | Reinholdsson et al. ...... 455/418 |
| 2004/0107271 A1 | 6/2004 | Ahn et al. |
| 2004/0165713 A1 | 8/2004 | Leighton |
| 2004/0203962 A1 | 10/2004 | Dutton et al. |
| 2004/0205164 A1 | 10/2004 | Jacobs et al. |
| 2004/0247993 A1 | 12/2004 | Johnson et al. |
| 2005/0022177 A1 | 1/2005 | McCaleb et al. |
| 2005/0054292 A1 | 3/2005 | Janusz et al. |
| 2005/0144237 A1 | 6/2005 | Heredia et al. |
| 2005/0146995 A1 | 7/2005 | Morita |
| 2005/0162936 A1 | 7/2005 | Suzuki et al. |
| 2005/0162937 A1 | 7/2005 | Suzuki et al. |
| 2005/0162938 A1 | 7/2005 | Suzuki et al. |
| 2005/0162939 A1 | 7/2005 | Suzuki et al. |
| 2005/0202857 A1 | 9/2005 | Seshadri et al. |
| 2005/0275626 A1 | 12/2005 | Mueller et al. |
| 2006/0121955 A1 | 6/2006 | Shlomot |
| 2006/0149850 A1 | 7/2006 | Bowman |
| 2006/0166715 A1 | 7/2006 | Van Engelen et al. |
| 2006/0166716 A1 | 7/2006 | Seshadri et al. |
| 2006/0184369 A1 | 8/2006 | Levonas |
| 2006/0265471 A1 | 11/2006 | Pitzel et al. |
| 2007/0042762 A1 | 2/2007 | Guccione |
| 2007/0094490 A1 | 4/2007 | Lohr |
| 2007/0124765 A1 | 5/2007 | Bennett et al. |
| 2007/0136610 A1 | 6/2007 | Lambinet |
| 2007/0147629 A1 | 6/2007 | Chiloyan |
| 2007/0147630 A1 | 6/2007 | Chiloyan |
| 2007/0149261 A1 | 6/2007 | Huddart |
| 2007/0153766 A1* | 7/2007 | Bienn et al. ................... 370/352 |
| 2007/0183453 A1* | 8/2007 | Kim et al. ..................... 370/486 |
| 2007/0232222 A1 | 10/2007 | de Jong |
| 2007/0249326 A1 | 10/2007 | Nelson |
| 2007/0250709 A1 | 10/2007 | Bailey, Jr. |
| 2007/0260615 A1 | 11/2007 | Shen |
| 2007/0260616 A1 | 11/2007 | Shen |
| 2007/0263066 A1 | 11/2007 | Henning et al. |
| 2007/0267474 A1 | 11/2007 | Shen et al. |
| 2007/0272738 A1 | 11/2007 | Berkun |
| 2007/0283033 A1 | 12/2007 | Bloebaum et al. |
| 2008/0004052 A1 | 1/2008 | Bloebaum et al. |
| 2008/0005045 A1 | 1/2008 | Saito |
| 2008/0046239 A1* | 2/2008 | Boo .............................. 704/235 |
| 2008/0071528 A1 | 3/2008 | Ubale et al. |
| 2008/0071617 A1* | 3/2008 | Ware .............................. 705/14 |
| 2008/0080694 A1 | 4/2008 | Usuba et al. |
| 2008/0161066 A1 | 7/2008 | Reda et al. |
| 2008/0161067 A1 | 7/2008 | Reda et al. |
| 2008/0201658 A1 | 8/2008 | Saito et al. |
| 2008/0201748 A1 | 8/2008 | Hasek et al. |
| 2008/0205664 A1 | 8/2008 | Kim et al. |
| 2008/0226094 A1 | 9/2008 | Rutschman |
| 2008/0232299 A1 | 9/2008 | Mosig |
| 2008/0233978 A1* | 9/2008 | Batey et al. ................... 455/462 |
| 2008/0260125 A1* | 10/2008 | Barnes et al. ............ 379/142.04 |
| 2008/0287063 A1* | 11/2008 | Kidron et al. ................. 455/41.2 |
| 2009/0061772 A1* | 3/2009 | Moon et al. ................... 455/41.2 |
| 2009/0074112 A1* | 3/2009 | Coersmeier et al. ........... 375/340 |
| 2009/0091655 A1* | 4/2009 | Russell et al. ................. 348/515 |
| 2009/0093264 A1* | 4/2009 | Heredia et al. ................ 455/466 |
| 2009/0097672 A1* | 4/2009 | Buil et al. ........................ 381/80 |
| 2009/0138547 A1* | 5/2009 | Boudreau ..................... 709/203 |
| 2009/0154740 A1* | 6/2009 | Regen et al. ................... 381/311 |
| 2009/0156134 A1* | 6/2009 | Regen et al. .................... 455/73 |
| 2009/0213962 A1* | 8/2009 | Sasaki ........................... 375/316 |
| 2009/0292799 A1* | 11/2009 | Eisener et al. ................. 709/223 |
| 2009/0319279 A1* | 12/2009 | Kong et al. ................... 704/500 |
| 2010/0017554 A1* | 1/2010 | Sun .............................. 711/103 |
| 2010/0054508 A1* | 3/2010 | Yang ............................. 381/310 |
| 2010/0128888 A1* | 5/2010 | Junge et al. ..................... 381/74 |
| 2010/0151788 A1* | 6/2010 | Rahman et al. ............... 455/41.2 |
| 2010/0156913 A1* | 6/2010 | Ortega et al. ................. 345/520 |
| 2010/0157886 A1* | 6/2010 | Jia et al. ........................ 370/328 |
| 2010/0160014 A1* | 6/2010 | Galasso et al. ................... 463/6 |
| 2010/0164386 A1* | 7/2010 | You ............................... 315/129 |
| 2010/0190532 A1* | 7/2010 | Sampat et al. ............... 455/569.1 |
| 2010/0191536 A1* | 7/2010 | Sampat et al. ................ 704/500 |
| 2011/0086629 A1* | 4/2011 | Simmons et al. ............. 455/418 |
| 2011/0289187 A1* | 11/2011 | Brodin et al. ................. 709/217 |

(56) References Cited

U.S. PATENT DOCUMENTS

FOREIGN PATENT DOCUMENTS

| EP | 1471423 | A2 | 10/2004 |
|---|---|---|---|
| JP | 11259304 | A | 9/1999 |
| JP | 2003209782 | A | 7/2003 |
| JP | 2004274138 | A | 9/2004 |
| JP | 2005501433 | A | 1/2005 |
| JP | 2005507197 | A | 3/2005 |
| JP | 2005354302 | A | 12/2005 |
| TW | 200502775 | | 1/2005 |
| TW | 200636580 | A | 10/2006 |
| WO | 0251199 | A2 | 6/2002 |
| WO | 03034762 | A1 | 4/2003 |
| WO | 2006027605 | A2 | 3/2006 |
| WO | 2007019702 | A1 | 2/2007 |

OTHER PUBLICATIONS

International Preliminary Report on Patentability—PCT/US2010/021664, The International Bureau of WIPO—Geneva, Switzerland, Mar. 3, 2011.
International Search Report and Written Opinion—PCT/US2010/021664, International Search Authority—European Patent Office—Jul. 21, 2010.

\* cited by examiner

DYNAMICALLY PROVISIONING A DEVICE

RELATED APPLICATIONS

This application is a continuation of U.S. patent application Ser. No. 12/362,098, filed Jan. 29, 2009, entitled DYNAMICALLY PROVISIONING A DEVICE WITH AUDIO PROCESSING CAPABILITY, which is hereby incorporated by reference in its entirety.

BACKGROUND

1. Field

This disclosure generally relates to communications, and more particularly, to devices that download an executable from a different device.

2. Background

Wired and wireless headsets are known. Conventional wired headsets include a wire running between an audio source and either one or two earpieces that are intended to fit on or within a user's ears. In many cases, wireless headsets are simply replacements for wired headsets. In such circumstances, a wireless headset substitutes a wireless link, usually a radio frequency (RF) or infrared (IR) channel, for the wire running between the headset and audio source. Wireless headsets are used to provide a greater degree of user freedom, as the user is no longer tethered to the audio source by a wire. It is known for both wired and wireless headsets to be used with audio sources such as communication devices, e.g., cordless telephones, mobile radios, personal digital assistants (PDAs), cellular subscriber units and the like, as well as other source devices, such as MP3 players, stereo systems, radios, video games, personal computers, laptop computers and the like.

Known wireless headsets communicate with audio sources using RF or IR wireless technology. Such wireless headset communications have been extended to personal wireless networks, such as the one defined by the Bluetooth Specification available at www.bluetooth.com. The Bluetooth Specification provides specific guidelines for providing wireless headset functionality. In particular, the Bluetooth Specification provides a Headset Profile that defines the requirements for Bluetooth devices necessary to support the Headset use case. Once configured, the headset can function as a device's audio input and/or output. Thus, a particularly popular use of Bluetooth networks is to provide wireless headset connectivity for cellular telephones and PDAs. In addition, the Bluetooth Specification also provides the Advanced Audio Distribution Profile (A2DP) that defines protocols and procedures for wirelessly distributing high-quality stereo or mono audio over a Bluetooth network. The purpose of this Profile is to connect to MP3 music players such as the Zune, iPod, and the like.

Although wireless headsets are an improvement over wired headsets in some circumstances, there are still opportunities to further improve wireless headsets, as well as wired headsets.

SUMMARY

Disclosed herein are techniques and apparatuses for improving the interoperability of devices, such as second devices, so that they may support different encoding formats and so that may also have their processing software/firmware conveniently updated or modified.

According to one aspect, an apparatus includes a downloader configured to download an executable to a device over a wireless link. The executable configures the device to process encoded data in a specific format.

According to another aspect, an apparatus includes a wireless communication device configured to download an executable to a second device over a wireless link. The executable configures the second device to decode encoded data in a specific format.

According to another aspect, a method of provisioning a wireless device with encoding capability includes determining whether the wireless device is capable of decoding encoded data in a specific format, and downloading an executable to the wireless device over a wireless link. The executable configures the wireless device to decode encoded data in the specific format.

According to an another aspect, an apparatus includes means for determining whether the wireless device is capable of decoding encoded data in a specific format, and means for downloading an executable to a wireless device over a wireless link. The executable configures the wireless device to decode encoded data in the specific format.

According to a further aspect, a computer-readable medium, embodying a set of instructions executable by one or more processors, includes code for determining whether the wireless device is capable of decoding encoded data in a specific format, and code for downloading an executable to the wireless device over a wireless link. The executable configures the wireless device to decode encoded data in the specific format.

Other aspects, features, processes and advantages will be or will become apparent to one with skill in the art upon examination of the following figures and detailed description. It is intended that all such additional features, aspects, processes and advantages be included within this description and be protected by the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the wireless headset system and its various aspects. In the figures, like reference numerals designate corresponding parts throughout the different views.

DETAILED DESCRIPTION

Figure 1:
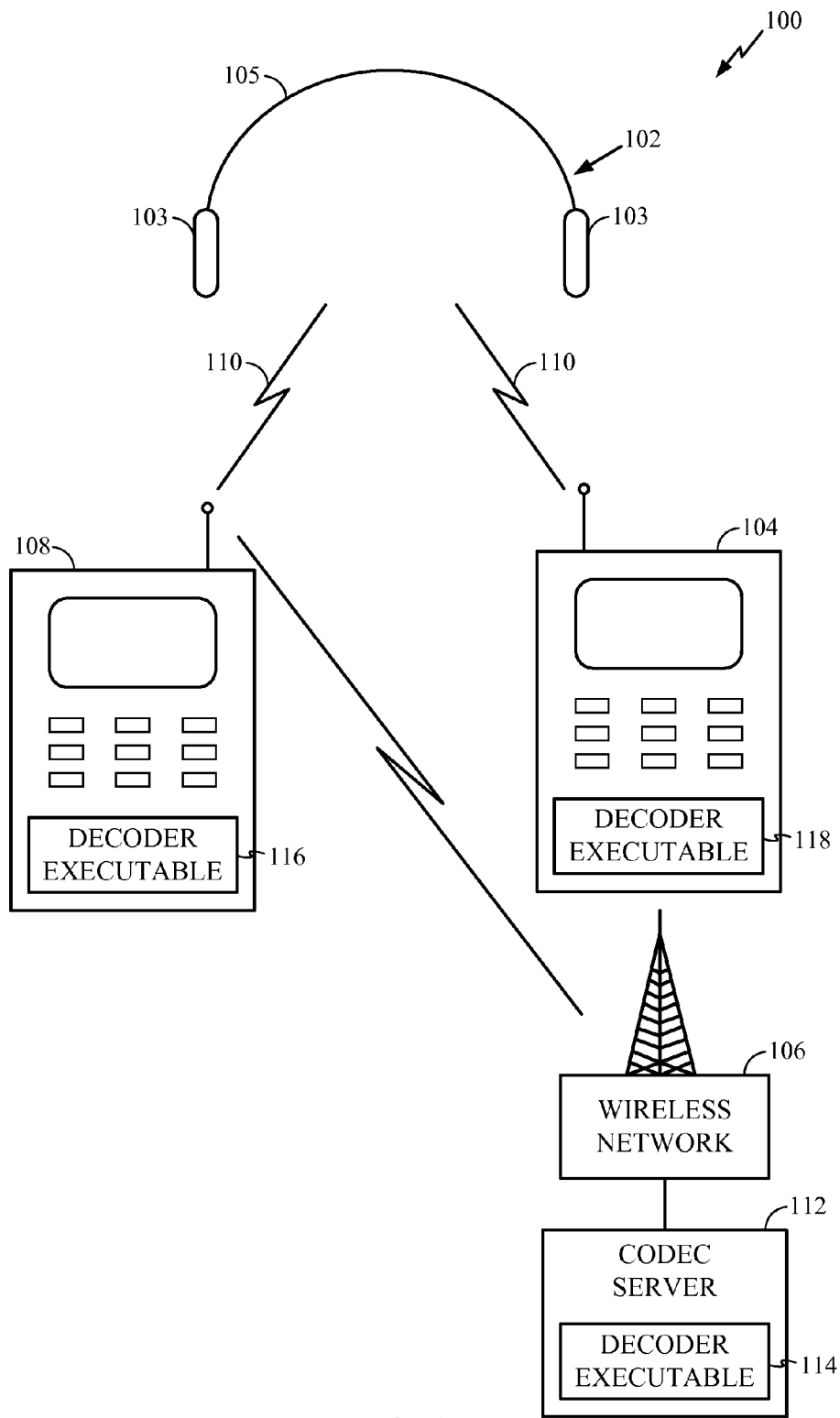
FIG. 1 is a diagram showing a communication system including a wireless headset.

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

The word "exemplary" is used throughout this disclosure to mean "serving as an example, instance, or illustration." Any embodiment or feature described herein as "exemplary" is not necessarily to be construed as preferred or advantageous over other embodiments or features.

Stereo music playback over wireless headsets and/or wireless speakers is becoming very popular. However, most current wireless headsets, e.g., Bluetooth headsets, support only a single baseline audio decoder called sub-band coding (SBC). SBC is a low-complexity decoder. Digitized audio available from various sources is often encoded using formats other than SBC. Indeed, there are currently multiple audio encoding formats, for example, raw pulse-code modulation (PCM), ADPCM, AAC, WMA, Real, MPEG-1 audio, MPEG-2 audio and the like. When there is a mismatch between the audio encoding format of an audio source and the encoding format used by a headset, the source audio may be transcoded into the headset-required encoding format so that the audio can be successfully played back by the headset. However, transcoding often results in a loss of audio quality.

The Bluetooth protocol also provides support for Service Discovery and Service Negotiation. This means that if a headset or other audio output device supports an audio coding format other than SBC, e.g., MP3, the audio source can send audio encoded in the alternative format to the headset or device, thereby avoiding transcoding source audio to SBC and the related loss of quality. However, to support multiple encoding formats without the loss of quality caused by transcoding, an audio output device would need to be able to decode a number of different encoding formats. An audio output device is any device that can output sound in response to electronic signals. Wireless battery-powered audio output devices, such as wireless headsets or speakers, have limited power, processing capability and memory, and thus, it is not generally practicable to have a multiplicity of audio codecs resident within a wireless audio output device.

To effectively support multiple audio formats, disclosed herein are novel and non-obvious apparatuses and methods for dynamically downloading an audio executable to an audio output device's memory. The audio executable is software code, executable by a processor in the audio output device, that configures the audio output device to process audio in the audio encoding format provided by the audio source. The audio executable may include a decoder executable, which is software code that configures the audio output device to decode audio according to the encoding format provided by the audio source. Additionally/alternatively, the audio executable may include audio post-processing software code. To maintain interoperability with existing Bluetooth systems, the audio output device may, in some circumstances, retain read-only memory (ROM) support for SBC.

Turning now to the drawings, and in particular to FIG. 1, there is shown an exemplary communication system 100 including an audio output device, e.g., a wireless headset 102. The system 100 includes the wireless headset 102, which is capable of communicating with one or more audio sources, e.g., a first audio source, such as a music player 104, and a second audio source, such as a wireless communication device (WCD) 108, over one or more wireless links 110. Although illustrated as a music player 104 and WCD 108, the audio sources may be any device capable of transmitting audio signals to the headset 102 such that the audio represented by the audio signals can be output from speakers in the headset 102.

Although the system 100 and headset 102 are not limited to MP3 formatted music, the music player 104 may be an MP3 music player.

The WCD 108 may be any suitable communication device capable of two-way radio communications, e.g., mobile radio, cordless phone, personal digital assistant (PDA), cellular subscriber unit, personal computer, laptop computer or the like. In the example shown, the WCD 108 is a device capable of communicating with one or more base stations within a wireless communication network 106. Examples of suitable wireless communications networks include, but are not limited to, code-division multiple access (CDMA) based networks, WCDMA, GSM, UTMS, AMPS, PHS networks or the like. The wireless network 106 includes infrastructure comprising those network elements necessary to support wireless voice and/or data communications with the WCD 108. The wireless communication infrastructure includes equipment such as controllers, transceivers and backhaul that establishes and maintains wireless communication with the WCD 108, as well as other terminal devices. The types and numbers of devices within the wireless infrastructures depend on the particular wireless network. For example, a typical cellular network includes sector antennas connected to several base transceiver stations (BTSs) connected to base station controllers (BSCs) that are connected to a mobile switching center(s) (MSC). Cellular base station controllers are typically capable of communicating with an IP-based network, such as the Internet, via a packet data server node (PDSN). Base stations are also capable of communicating with the public switched telephone network (PSTN) via the MSC. Thus, conventional cellular base stations included in the wireless network 106 use the MSC and PSTN to provide conventional voice connections and telephony services between the WCD 108 and other telephone devices, such as conventional landline phones.

The wireless communications network 106 may communicate with a codec server 112 over a suitable network, such as the Internet. The codec server 112 stores and provides audio codec software, such as one or more decoder executables 114, to the WCD 108 through the wireless network 106. The codec server 112 may include a website server application and/or any other suitable software or means for allowing the WCD 108 to access and selectively download audio codec software (e.g., the decoder executable 114) for the headset 102, so that audio codec software may in turn be downloaded to the headset 102 by the WCD 108, as described herein below in further detail.

The music player 104 and/or the WCD 108 are configured to download decoder executables 116, 118, respectively, to a headset's memory. Bluetooth Profiles and Protocols (e.g., the Service Discovery Protocol and Generic Object Exchange Profile), as defined by the Bluetooth Specification, may be used to effect downloading of the decoder executables 116, 118. Each decoder executable 114, 116, 118 configures the headset 102 to decode audio in the raw encoded format provided by the particular audio source 104 or 108. The decoder executables 114, 116 and 118, may or may not be the same software code, depending on the audio format used by the active audio source and the configuration of the audio source. To maintain interoperability with existing Bluetooth systems, the headset 102 may, in some circumstances, retain read-only memory (ROM) support for SBC.

Although the exemplary communication system 100 illustrates the WCD 108 and music player 104 as being separate devices, the functions of the two devices can be combined into a single wireless device, i.e., a combined two-way communication device and music player.

The audio signals transmitted to and from the headset 102 can represent any form of discernable sound, including but not limited to voice and monaural or stereo audio. The audio signals transmitted between the audio sources and the headset 102 over the wireless channels can represent digitized audio sampled at the industry standard rate of 44.1 KHz. Other standard rates are 8 kHz, 16 kHz, 48 kHz, and other rates may also be used.

The wireless links 110 may be any suitable wireless communication channels, including a radio frequency (RF) channel or infrared (IR) channel between the headset 102 and audio sources 104, 108, using any suitable communications protocol for transferring audio from either audio source 104, 108 to the headset 102. In the example shown, each wireless link 110 may be a Bluetooth wireless link.

The audio may include Bluetooth streaming audio resulting from a connection established between the music player 104 and the headset 102, or between the WCD 108 and the headset 102, as described in the Bluetooth A2DP specification. After the Bluetooth streaming audio connection is established, audio packets are transmitted from the audio source to the headset 102. Generally, the audio packets include digitized audio that is encoded using a negotiated codec standard. Each audio packet represents a predetermined duration of sound, e.g., 20 milliseconds, that is to be output at the headset 102. The audio packets can be formatted according to the A2DP profile, including one or more frames of encoded audio.

The headset 102 may have any suitable size, shape or physical configuration. The exemplary wireless headset 102 shown in FIG. 1 includes two earpieces 103 and at least one support, such as a headband 105, for allowing the headset 102 to be comfortably worn by a user.

Although illustrated with the headband 105, the headset 102 and earpieces 103 can having any suitable physical shape and size adapted to securely fit the earpieces 103 over or into a user's ears. The headband 105 may be optionally omitted from the headset 102. For example, the earpieces 103 can be conventional hook-shaped earpieces for attaching behind a user's earlobe and over or into the user's ear canal. In addition, although the headset 102 is illustrated as having two earpieces 103, the headset 102 may alternatively include only a single earpiece.

Figure 2:
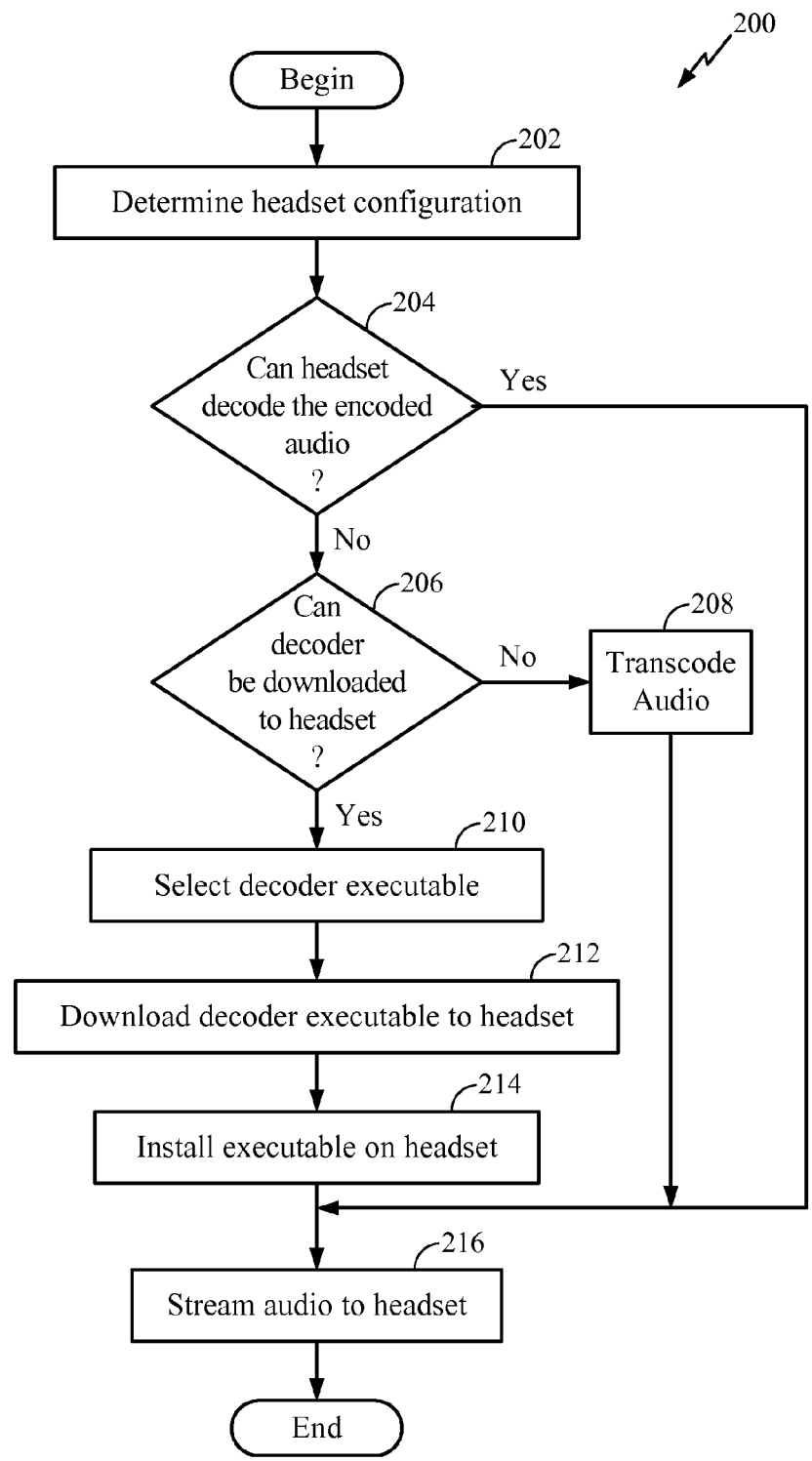
FIG. 2 is a flowchart illustrating a method of dynamically provisioning a wireless headset with an audio decoder.

FIG. 2 is a flowchart illustrating a method 200 of dynamically provisioning the wireless headset 102 with an audio decoder. In block 202, the configuration of the headset 102 is determined. The configuration of the headset 102 indicates the headset's capabilities, e.g., manufacturer, model number, its processor, memory capacity, firmware version, default audio codec (if any), current audio decoder type and/or version, or the like. Additionally/alternatively, the configuration information may include the headset's hardware revision number, which can either be read from a hardware register that indicates the version of the headset hardware or it can be a part of the headset software. The revision number indicates the capability of the particular headset hardware configuration, for example, it may indicates the presence of a processor and a digital signal processor (DSP) both within the headset 102, the size and configuration of the memories in the headset 102, such as the size of a flash memory, random access memory (RAM) or the like.

The headset configuration may be determined by downloading and reading a configuration code, which may include the hardware revision number, stored within the headset 102.

In decision block 204, a check is made to determine whether the headset 102 is configured to decode the encoded audio available from the audio source. The audio at the source can be encoded using any suitable audio codec, including but not limited to raw pulse-code modulation (PCM), ADPCM, AAC, WMA, Real, MPEG-1 audio, MPEG-2 audio or the like. This determination can be made based on the configuration information provided by the headset 102 in block 202.

If the headset 102 is capable of decoding the source's encoded audio, the audio is streamed from the source to the headset 102 without the need to download a decoder executable (block 216). If the headset is not configured to decode the audio, a check is made to determine whether an appropriate decoder executable can be successfully downloaded to the headset 102 (block 206). This determination may be made based on the headset configuration information obtained in block 202 and the availability of the appropriate audio decoder executable at the audio source.

If the headset 102 is not configured to download a decoder executable, the audio source proceeds to transcode the audio into a format usable by the headset 102 (block 208), e.g., SBC for a Bluetooth headset. The transcoded audio is then streamed to the headset 102 over the wireless link 110 (block 216), where it is then rendered and played back to a headset listener.

If the headset 102 is able to have a decoder executable downloaded to it, a suitable decoder executable is selected for the headset 102 (block 210). The decoder executable may be selected based on the headset configuration information obtained in block 202 and also the format of the source's encoded audio that is to be streamed to the headset 102. The audio source may store one or more versions of a decoder executable. If the audio source does not have a decoder executable version matching the configuration code of the headset 102, it may establish a file transfer session with the codec server 112 to fetch the correct version from the server 112, and then download the correct version to the headset 102. If the audio source is unable to obtain the appropriate decoder executable, it may indicate such to the headset 102 and default to downloading transcoded audio or terminating the session with the headset 102.

In block 212, the selected decoder executable is downloaded to the headset 102 over the wireless link 110. As discussed below in further detail, the Bluetooth Generic Object Exchange Profile may be used to download the decoder executable to the headset 102. The decoder executable may be a pre-built executable binary file, suitable for the capabilities of the headset 102.

In block 214, the downloaded decoder executable is installed on the headset 102. Once the decoder executable is downloaded to the headset 102, the top-level code on the headset 102 may perform initialization of the relevant components within the headset 102 with the new, downloaded software. For example, the decoder executable, in addition to including audio decoder software code, may contain a new version of headset processor firmware. In that case, the top-level headset firmware code would execute to first update the processor with the new version of firmware, and then reset the processor so that the new firmware and new audio decoder could then be executed by the headset processor. After installation, the headset 102 is ready to receive the encoded audio.

In block 216, the encoded audio is streamed to the headset 102 over the wireless link 110 from the audio source, either music player 104 or WCD 108.

Figure 3:
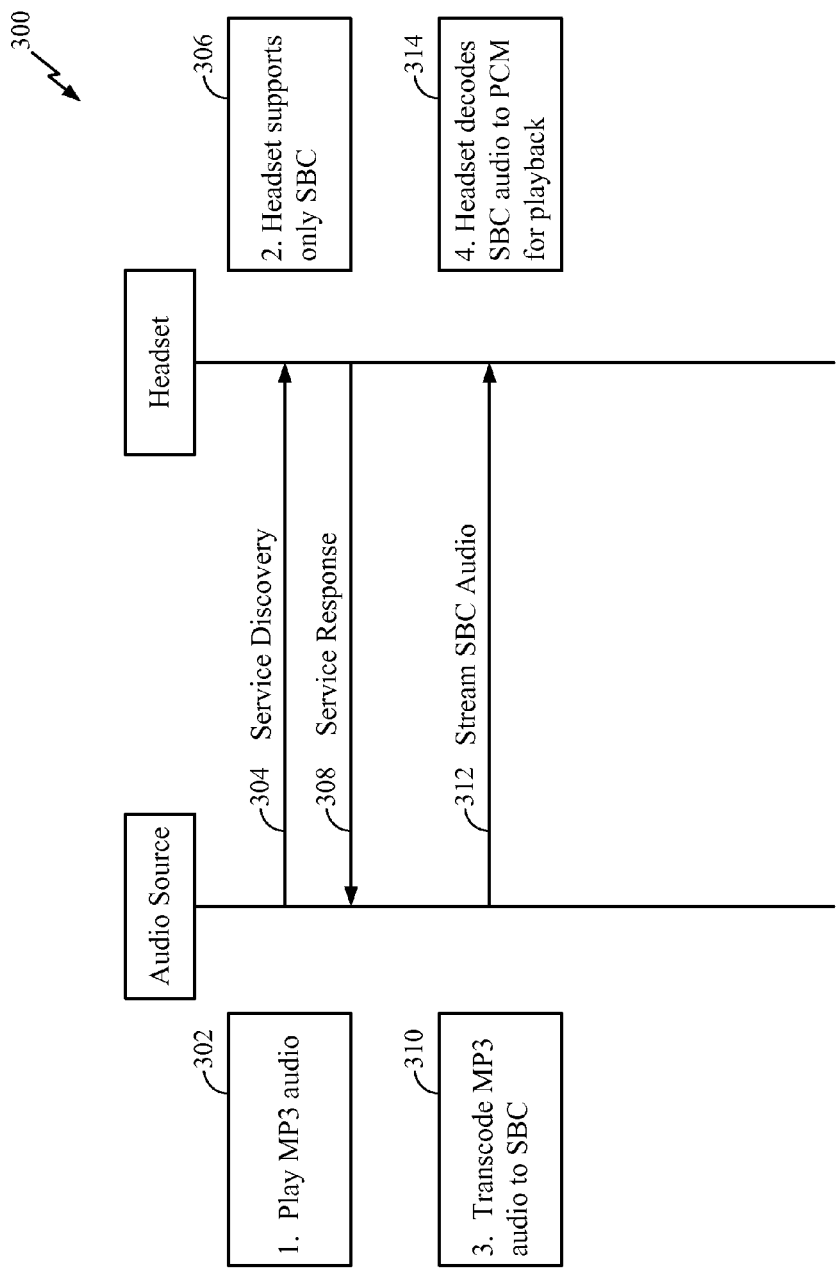
FIG. 3 is a diagram illustrating an exemplary scenario of streaming audio to a headset.

FIG. 3 is a diagram illustrating an exemplary scenario 300 of streaming audio to the headset 102 using a Bluetooth wireless interface between the headset 102 and one of the audio sources, either the music player 104 or WCD 108. In block 302, a request to play encoded audio is received at an audio source. The request can be made by a user. For example, the user may request audio playback using a user interface included in the audio source. In the example shown, the audio to be downloaded is encoded in an MP3 format.

After receiving the request, the audio source, acting as a Bluetooth client, sends a Service Discovery Request 304 to the headset 102 over the wireless link 110, using the Bluetooth Service Discovery Protocol (SDP). The Service Discovery Request is a query to the headset 102 to determine what audio encoding formats are supported by the headset 102. The Service Discovery Request may also ask for headset configuration information.

Upon receiving the Service Discovery Request 304, the headset 102, acting as a Bluetooth server, generates an SDP Service Response 308 indicating its configuration and also that it only supports audio encoded in an SBC format (block 306). The service response 308 is an SDP message that is sent from the headset 102 to the audio source over the wireless link 110. It may include a SDP service record containing attributes indicating audio decoder(s) supported by the headset 102 and the headset configuration information.

From the Service Response 308, the audio source determines that the headset 102 is not configured to decode MP3 formatted audio and also that the headset 102 can not be re-configured by downloading an MP3 decoder executable. Thus, the audio source proceeds to transcode the audio from the MP3 format to the SBC format (block 310), or otherwise provide the request audio in SBC format. Other Bluetooth profiles, protocols and procedures may be used determine the audio decoding capabilities and configuration of the headset 102.

Next, using the Bluetooth A2DP, a streaming audio connection is established between the audio source and the headset 102, where the headset is a Bluetooth audio sink. The transcoded SBC audio is then streamed 312 to the headset 102 over the wireless link 110 using the A2DP. In block 314, the headset 102 decodes the received SBC audio to PCM audio for playback at the headset 102.

Figure 4:
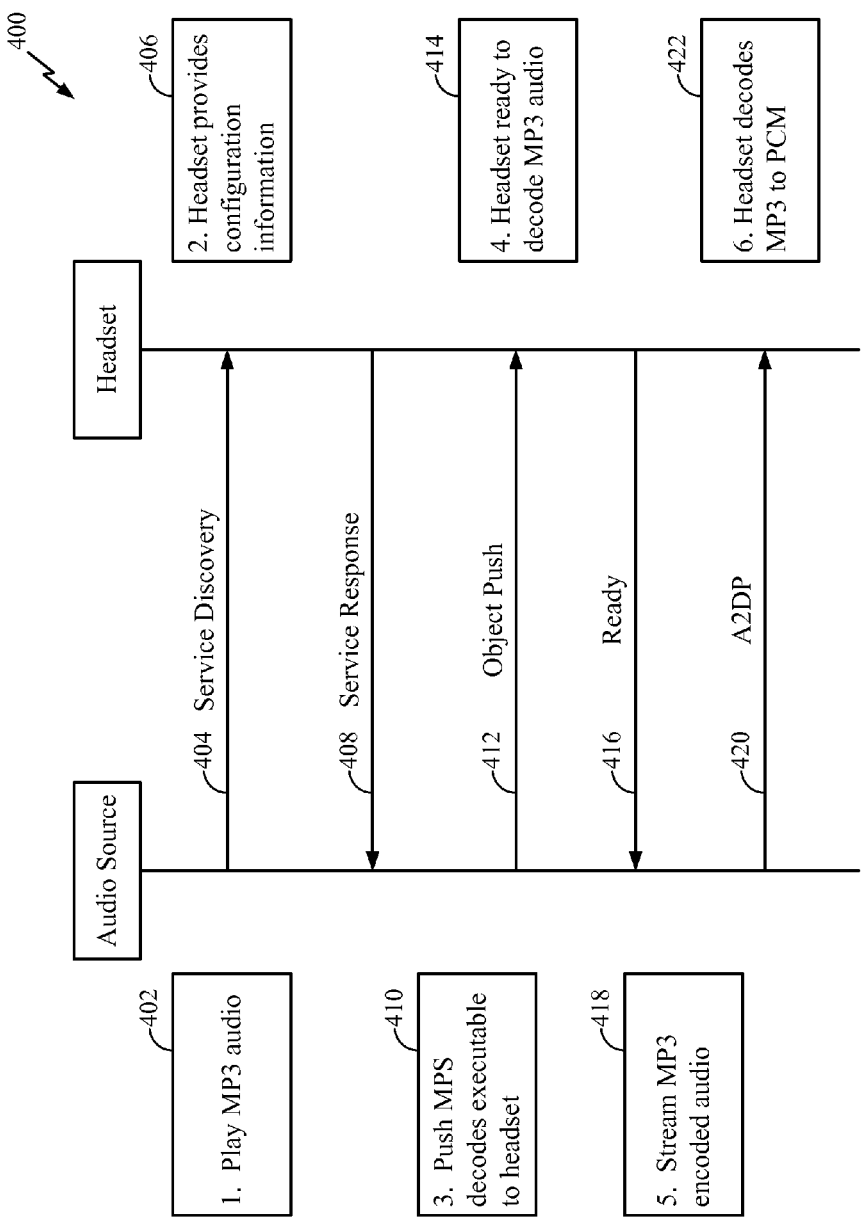
FIG. 4 is a diagram illustrating an exemplary scenario of downloading an audio decoder and streaming audio to a headset.

FIG. 4 is a diagram illustrating an exemplary scenario 400 of downloading an audio decoder and streaming audio to the headset 102 using a Bluetooth wireless interface between the audio source and the headset 102. In block 402, a request to play encoded audio is received at the audio source. The request can be made by a user. For example, the user may request audio playback using a user interface included in the audio source. In the example shown, the requested audio to be downloaded is encoded in an MP3 format.

After receiving the request, the audio source, acting as a Bluetooth client, sends a Service Discovery Request 404 to the headset 102 over the wireless link 110, using the Bluetooth Service Discovery Protocol (SDP). The Service Discovery Request is a query to the headset 102 to determine what audio encoding formats are supported by the headset 102. The Service Discovery Request may also ask for headset configuration information.

Upon receiving the Service Discovery Request 404, the headset 102, acting as a Bluetooth server, generates an SDP Service Response 408 indicating its configuration (block 406). The Service Response 408 is an SDP message that is sent from the headset 102 to the audio source over the wireless link 110. It may include an SDP service record containing attributes indicating audio decoder(s) supported by the headset 102, the capability to received decoder executables, and headset configuration information. In this scenario, the service response 408 indicates that the headset 102 can receive decoder executables and be re-configured to support various audio encoding formats, including the MP3 format. Other Bluetooth profiles, protocols and procedures may be used determine the audio decoding capabilities and configuration of the headset 102.

From the Service Response 408, the audio source determines that the headset 102 can be configured to decode MP3 formatted audio and also that the headset 102 can be re-configured to do so by downloading an MP3 decoder executable.

Thus, the audio source proceeds to establish an object exchange session with the headset 102 in accordance with the Bluetooth Generic Object Exchange Profile (GEOP). During this session, the audio source acts as a Bluetooth client, and the headset acts as a Bluetooth server. The audio source pushes an MP3 decoder executable on the headset 102 (block 410). The decoder executable is transferred from the audio source to the headset 102 over the wireless link 110 using an object push 412 (GEOP PUT operation). After the decoder executable is successfully downloaded to the headset 102, the GEOP session terminates. Other Bluetooth file transfer profiles, protocols and procedures may be used for downloading the decoder executable to the headset 102.

In block 414, the headset 102 installs the MP3 decoder executable using a decoder downloader, making the headset 102 ready to decode incoming MP3 audio. The headset 102 signals the audio source over the wireless link with a ready message 416, indicating that the headset is ready to receive streaming MP3 audio. The ready signal may be part of the Bluetooth A2DP session setup signaling.

Next, using the Bluetooth A2DP, a streaming audio connection is established between the audio source and the headset 102, where the headset 102 is a Bluetooth audio sink. In block 418, the audio source commences streaming the MP3 audio to the headset 102, in response to receiving the ready message 416. The MP3 encoded audio is transferred to the headset 102 using the A2DP protocol 420. In block 422, the headset 102 decodes the received MP3 audio to PCM audio, using the installed MP3 decoder, for playback at the headset 102.

Figure 5:
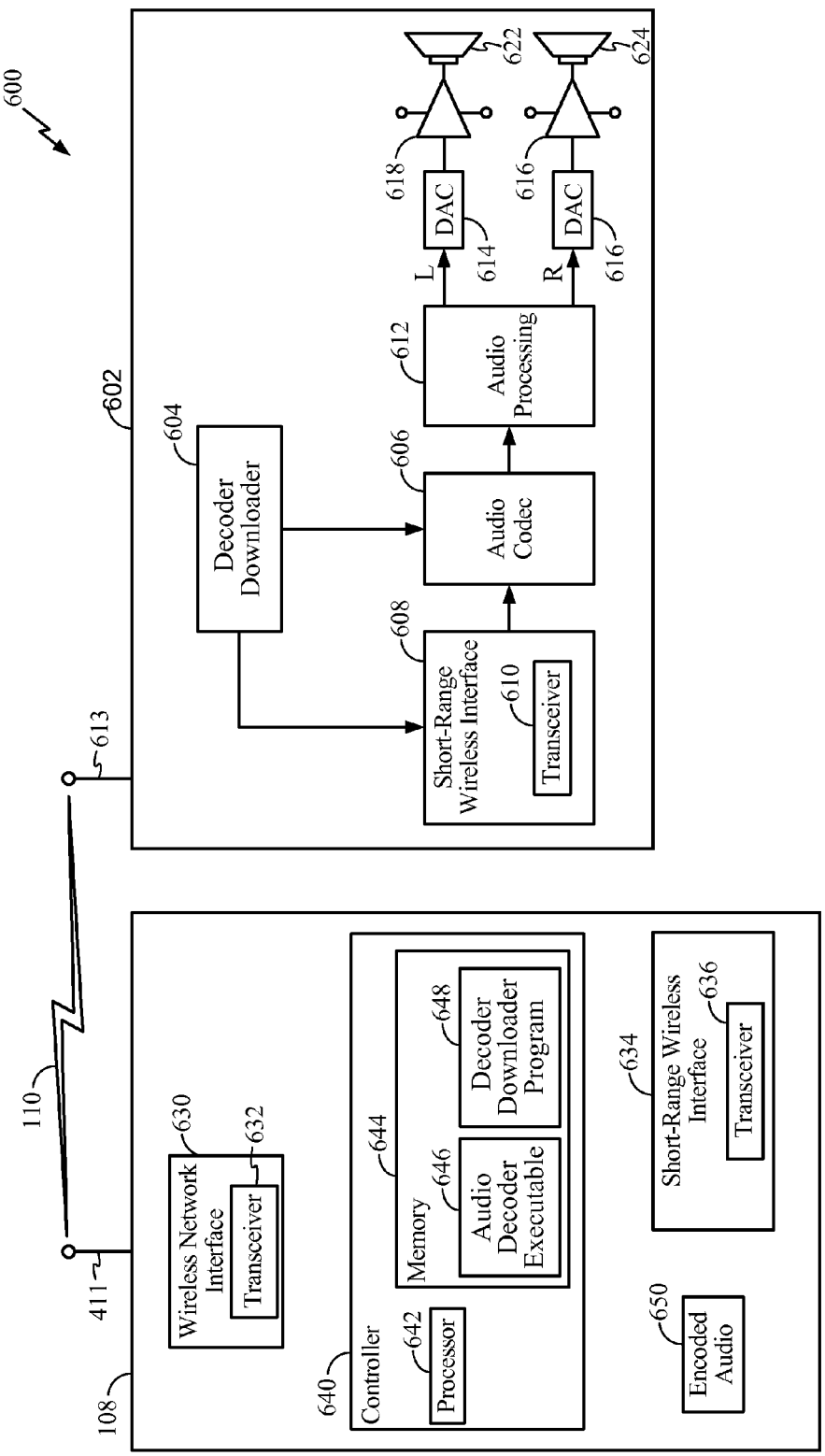
FIG. 5 is a block diagram illustrating certain components of a first wireless headset system.

FIG. 5 is a block diagram illustrating certain components of a first wireless headset system 600. The wireless headset system 600 includes a wireless headset 602 and a WCD 108, each capable of communicating with one another over the wireless link 110. The wireless headset system 600 may be included in the communication system 100, fulfilling the role of wireless headset 102. The WCD 108 may include the features and functions of the WCD 108 and/or the music player 104, and the wireless headset 602 may include the features and functions of the wireless headset 102.

The wireless headset 602 includes a short-range wireless interface 608 coupled to an antenna 613 for communicating with the WCD 108 over the wireless link 110. The wireless headset 602 also includes a decoder downloader 604, an audio codec 606, audio processing circuitry 612, a left-channel digital-to-analog converter (DAC) 614, a right-channel DAC 616, a left-channel headphone high-impedance (HPH) amplifier (Amp) 618, a right-channel HPH amplifier (Amp) 620, a left-channel earphone speaker 622, and a right-channel earphone speaker 624.

The short-range wireless interface 608 includes a transceiver 610 and provides two-way wireless communications with the WCD 108 through the antenna 613. Although any suitable wireless technology can be employed with the headset 602, the short-range wireless interface 608 preferably includes a commercially-available Bluetooth module that provides at least a Bluetooth core system consisting of the antenna 613, a Bluetooth RF transceiver, baseband processor, protocol stack, as well as hardware and software interfaces for connecting the module to the audio codec 606, decoder downloader 604, and other components, if required, of the headset 602.

Digitized audio streams are output from the short-range wireless interface 608, and decoded by the audio codec 606. The coding scheme of the digitized audio stream may be any suitable scheme compatible with the audio codec 606, if used, and thus, the audio streams may, in some circumstances, be raw audio samples, such as pulse code modulation (PCM) samples, or in other circumstances, digitally encoded and/or compressed audio, such SBC or MP3 audio, depending on the installed audio codec.

The decoder downloader 604 downloads a decoder executable 646 to the headset 602 over the wireless link 110, in the event that headset 602 is not currently configured to decode encoded audio 650 available from the WCD 108. The decoder downloader 604 may maintain headset configuration information and implement the headset decoder downloading procedures described above in connection with FIGS. 1-4.

The audio codec 606 may include a default decoder, such as SBC, and may also be updated by the decoder downloader 604 to include a different audio decoder for process different audio encoding formats, as necessary.

The audio processing circuit 612 includes digital circuitry to process the decoded digitized audio signals in the digital domain. For example, decoded audio stream may be truncated one or more times, filtered one or more times, amplified one or more times, and upsampled one or more times by the audio processing circuit 612. Filtering may include low pass filtering, high pass filtering, and/or passing the stream through filters characterized by other kinds of filter functions. Amplification in the digital domain may include the use of a programmable gain amplifier (PGA).

The audio processing circuit 612 may be implemented using commercially-available, off-the-shelf components. The circuit 612 may include audio processing circuitry for processing the left and right channels separately. Alternatively, the audio processing circuit 612 may include a single, multiplexed audio processing path that handles both left and right audio channels. Also, some or all of the functions of the audio processing circuit 612 may be implemented as software executable on a processor, such as a digital signal processor (DSP).

The left-channel DAC 614 converts left-channel digitized audio output from the audio processing circuit 612 into a left-channel analog audio signal. The left channel analog audio signal is then amplified by the audio amplifier 614 to drive the left speaker 622.

The right-channel DAC 616 converts right-channel digitized audio output from the audio processing circuit 612 into a right-channel analog audio signal. The right-channel analog audio signal is then amplified by the audio amplifier 422 to drive the right speaker 624.

One of ordinary skill in the art will understand that additional analog audio processing circuitry (not shown), beyond the audio amplifiers 618, 620, may be included in the headset 602.

The left and right headset speakers 622, 624 are any suitable audio transducer for converting the electronic signals output from the amplifiers 618, 620, respectively, into sound.

The WCD 108 includes a wireless wide-area network (WWAN) interface 630, one or more antennas 411, a short-range wireless interface 634, a controller 640 having a processor 642 and a memory 644 storing one or more audio decoder executables 646 and a decoder downloader program 648. The WCD 108 also includes encoded audio 650 stored on the WCD 108. The WCD 108 can include separate antennas for communicating over the short-range wireless link 110 and a WWAN link, or alternatively, a single antenna may be used for both links.

The WWAN interface 630 comprises the entire physical interface necessary to communicate with a WWAN, such as the wireless network 106 described above in connection with FIG. 1. The interface 630 includes a wireless transceiver 632 configured to exchange wireless signals with a WWAN. The WWAN interface 630 exchanges wireless signals with the WWAN to facilitate voice calls and data transfers over the WWAN to a connected device. The connected device may be another WWAN terminal, a landline telephone, or network service entity such as a voice mail server, Internet server or the like.

The short-range wireless interface 634 includes a transceiver 636 and provides two-way wireless communications with the wireless headset 602. Although any suitable wireless technology can be employed with the WCD 108, the short-range wireless interface 636 preferably includes a commercially-available Bluetooth module that provides at least a Bluetooth core system consisting of the antenna 411, a Bluetooth RF transceiver, baseband processor, protocol stack, as well as hardware and software interfaces for connecting the module to the controller 640 and other components, if required, of the WCD 108.

The decoder downloader program 648 configures the WCD 108 to execute the procedure of blocks 202-212 and 216 of FIG. 2. The decoder downloader program 648 may also configure the WCD 108 to operate as the audio source, as described above in connection with FIGS. 3 and 4.

The audio decoder executable 646 is a decoder executable that can be downloaded to the headset 602 in accordance with the procedures described in connection with FIGS. 2 and 4. The audio decoder executable 646 may be uploaded into the WCD memory 644 from the codec server 112, as described in connection with FIGS. 1 and 2, under control of the decoder downloader program 648.

The encoded audio 650 can include one or more files of encoded audio for playback. The format of the encoded audio 650 typically corresponds to the format used by the audio decoder executable 646, and may be any of the audio encoding formats described herein. The encoded audio 650 may be stored in memory 644, or alternatively, in a separate mass storage device (not shown), such as a flash memory, included in the WCD 108.

The components of the headset 602 may be implemented using any suitable combination of analog and/or digital hardware, firmware or software.

Figure 6:
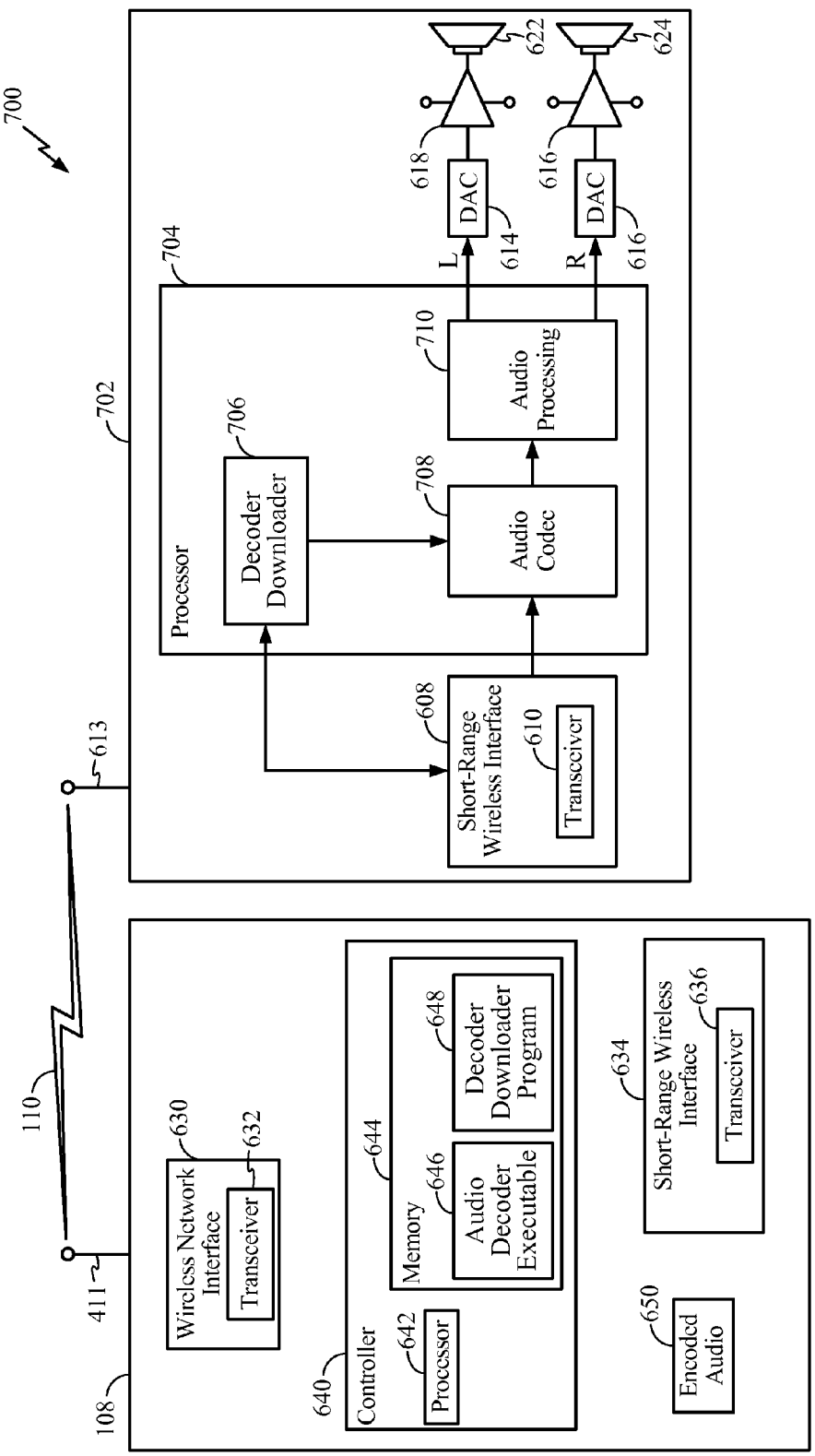
FIG. 6 is a block diagram illustrating certain components of a second wireless headset system.

FIG. 6 is a block diagram illustrating certain components of a second wireless headset system 700. The second wireless headset system includes a wireless headset 702 configured to communicate with the WCD 108 by way of the wireless link 110. The wireless headset 702 may be included in the wireless communication system 100, fulfilling the role wireless headset 102.

The wireless headset 702 includes a processor 704 that implements a decoder downloader 706, audio codec 708 and audio processing circuitry 710. The decoder downloader 706, audio codec 708 and audio processing circuitry 710 perform essentially the same functions as the decoder downloader 604, audio codec 606 and audio processing circuitry 612, respectively, shown in FIG. 5. However, in the headset 702, the functions of the components 706-710 are implemented as software executing on the processor 704. The processor 704 can be a microprocessor, such as an ARM7, DSP, one or more application specific integrated circuits (ASICs), field programmable gate arrays (FPGAs), complex programmable logic devices (CPLDs), discrete logic, or any suitable combination thereof.

Figure 7:
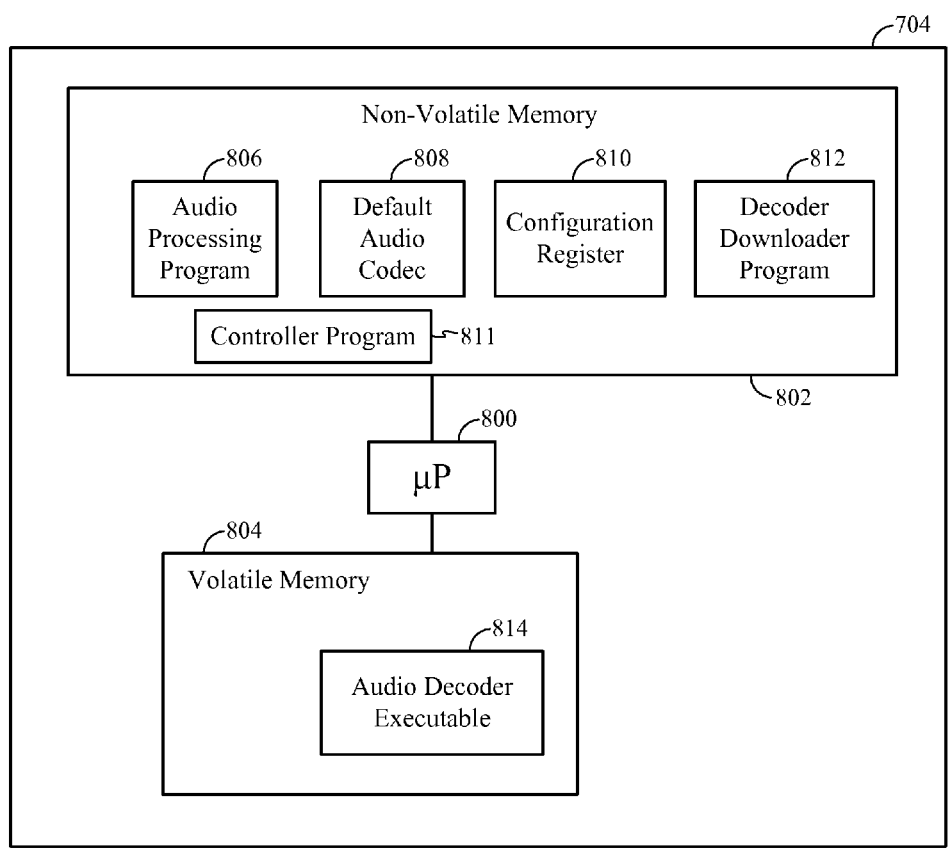
FIG. 7 is a block diagram illustrating certain components of the exemplary processor shown in FIG. 6.

FIG. 7 is a block diagram illustrating certain components of the exemplary processor 704 shown in FIG. 6. The processor 704 includes a non-volatile memory 802, a microprocessor (μP) 800, and a volatile memory 804. The non-volatile memory 802, microprocessor (μP) 800, and volatile memory 804 can be coupled together and communicate on a common bus. The memories 802, 804 and microprocessor 800 may be integrated onto a single chip, or they may be separate components or any suitable combination of integrated and discrete components. In addition, other processor-memory architectures may alternatively be used.

The microprocessor 800 can be a microprocessor, such as an ARM7, DSP, one or more application specific integrated circuits (ASICs), field programmable gate arrays (FPGAs), complex programmable logic devices (CPLDs), discrete logic, or any suitable combination thereof.

The non-volatile memory 802 stores an audio processing program 806, a default audio codec 808, a configuration register 810, controller program 811 and a decoder downloader program 812. The non-volatile memory 802 may be any static memory device that maintains its stored contents after its power is turned off, such as a flash memory, ROM, PROM or the like.

The controller program 811 can be firmware that controls the overall operation of the headset 702, including user interface controls and audio processing. The controller program 881 can configure the short-range wireless interface 608, processor 704, and other components of the headset 702, as necessary, to process and/or decode the incoming audio streams in a manner so that the streams can be appropriately output through speakers 622, 624 to be meaningfully heard by a user.

In the example shown in FIG. 7, the volatile memory 804 stores an audio decoder executable 814 that has been downloaded to the headset 702. The volatile memory 804 may be any suitable memory device that loses its stored contents upon its supply power being discontinued, such as a dynamic RAM or the like.

Alternatively, the audio decoder executable 814 may be stored in the non-volatile memory 802.

The audio processing program 806 includes software code for performing the audio processing 710 functions. The default audio codec 808 is a resident audio decoder, such as SBC, that resides permanently within the headset 702, and may be used when a suitable decoder executable is not available. The configuration register 810 stores headset configuration information, such as the hardware revision number, that may be provided to a requesting audio source by the decoder downloader program 812.

The decoder downloader program 812 is a software application that performs the functions of the decoder downloader 706, when executed by the microprocessor 800.

Figure 8:
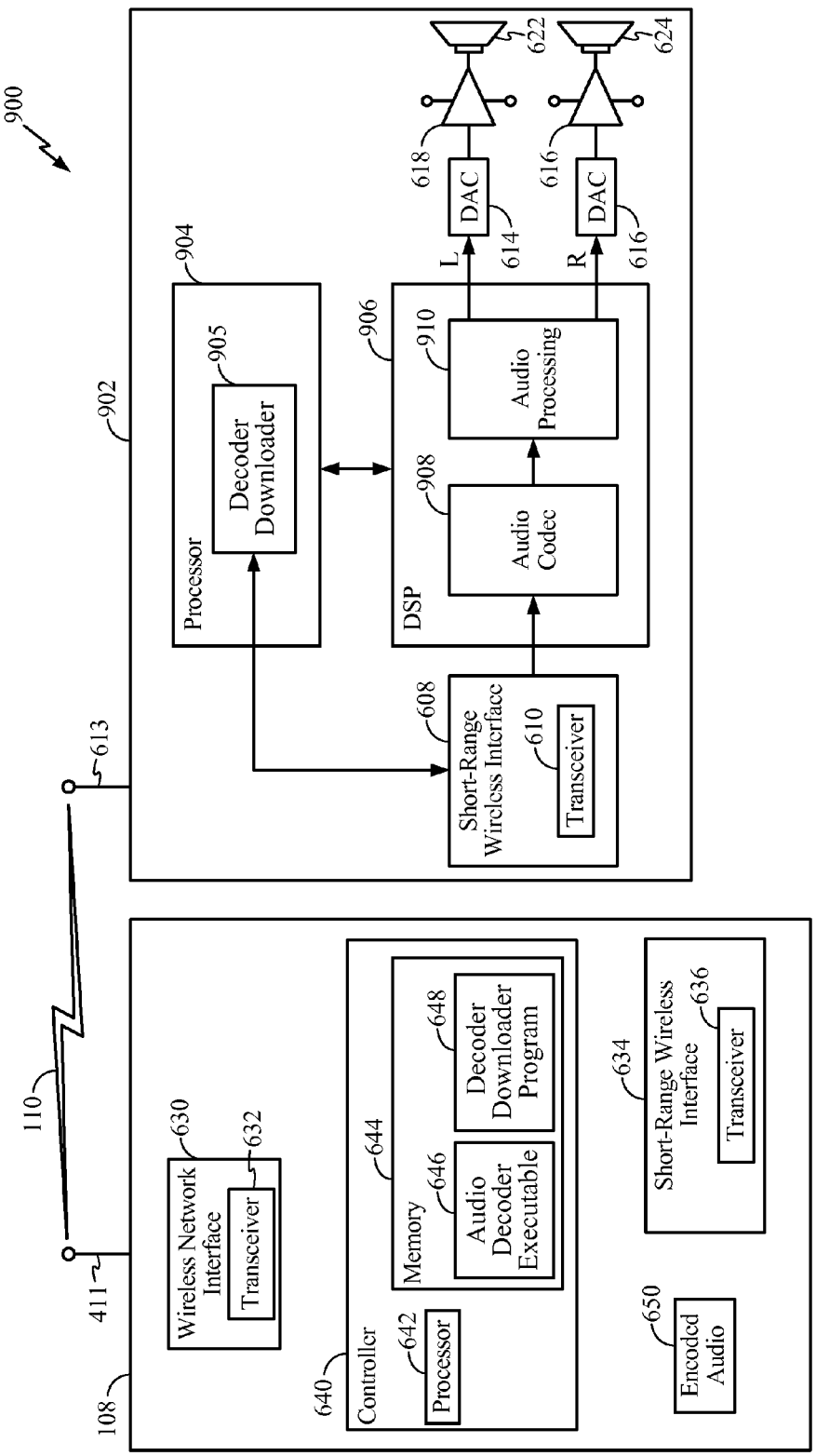
FIG. 8 is a block diagram illustrating certain components of a third wireless headset system.

FIG. 8 is a block diagram illustrating certain components of a third wireless headset system 900. The third wireless headset system 900 includes a wireless headset 902 configured to communicate with the WCD 108 by way of the wireless link 110. The wireless headset 902 may be included in the wireless communication system 100, fulfilling the role wireless headset 102.

The wireless headset 902 includes multi-processor architecture that includes a processor 904 that implements a decoder downloader 905 and a digital signal processor (DSP) 906 that implements an audio codec 908 and audio processing circuitry 910.

The processor 904 and DSP 906 can be coupled to and communicate over one or more buses and control signals.

Figure 9:
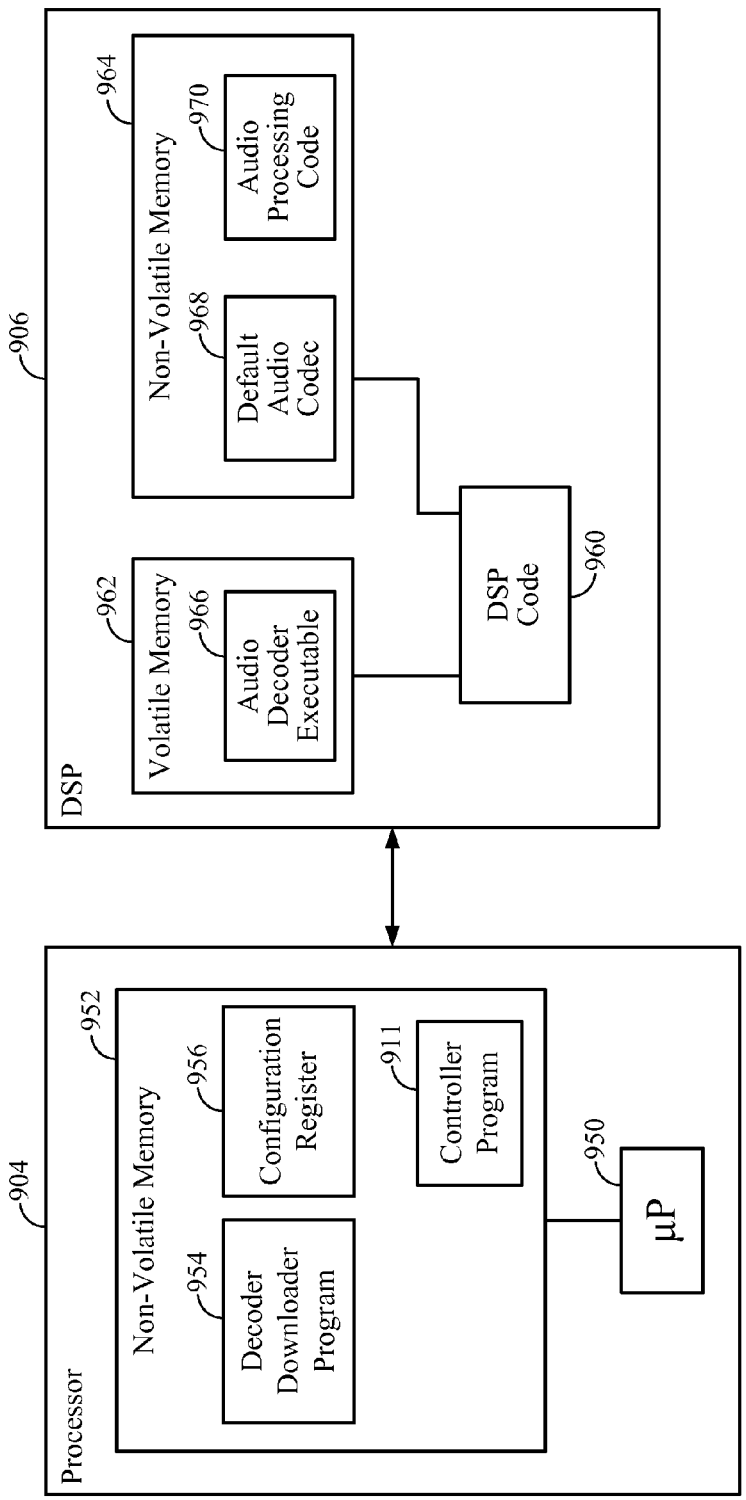
FIG. 9 illustrating certain components of the exemplary processor-DSP combination shown in FIG. 8.

FIG. 9 illustrates certain components of the exemplary multi-processor headset 902 shown in FIG. 8. The processor 904 includes a non-volatile memory 952 and a microprocessor (μP) 950. The microprocessor 950 and memory 952 can be coupled together and communicate over a bus. The non-volatile memory 952 stores a decoder downloader program 954, a controller program 911 and a configuration register 956. The downloader program 954, controller program 911 and configuration register 956 perform essentially the same functions as the downloader program 812, controller program 811 and configuration register 810 of FIG. 7, respectively. Other processor-memory architectures may alternatively be used.

The microprocessor 950 can be a microprocessor, such as an ARM7, DSP, one or more application specific integrated circuits (ASICs), field programmable gate arrays (FPGAs), complex programmable logic devices (CPLDs), discrete logic, or any suitable combination thereof.

The DSP 906 includes a volatile memory 962, a non-volatile memory 964, and DSP core 960. The non-volatile memory 964, DSP core 960, and volatile memory 962 can be coupled together and communicate on a common bus. Other processor-memory architectures may alternatively be used. The non-volatile memory 964 stores a default audio codec 968 and audio processing code 970. The default audio codec 968 and audio processing code 970 are essentially the same as the default audio codec 808 and audio processing code 806 described in connection with FIG. 7, respectively. The volatile memory 962 stores an audio decoder executable 966 that has been downloaded from an audio source.

The DSP core 960 can be any programmable DSP processing device optimized to perform signal processing operations, and may be implemented using an IP core, one or more application specific integrated circuits (ASICs), field programmable gate arrays (FPGAs), complex programmable logic devices (CPLDs), discrete logic, or any suitable combination thereof.

The non-volatile memories 952, 964 may each be any suitable static memory device that maintains its stored contents after its power is turned off, such as a flash memory, ROM, PROM or the like.

The volatile memory 962 may be any suitable memory device that loses its stored contents upon it supply power being discontinued, such as a dynamic RAM or the like.

The memories 954, 956, 962, 964, microprocessor 800 and DSP core 960 may be integrated onto a single chip, or they may be separate components or any suitable combination of integrated and discrete components.

The headsets 102, 602, 702 and 902 may also include an optional microphone (not shown) configured to produce an input audio signal that is preprocessed by a microphone preprocessor (not shown). The output of the microphone preprocessor may be provided to the transceiver, where it may then be provided to the audio processing path in the headsets 602, 702 and 902 and/or the WCD 108 over the wireless link 110. The microphone may be any suitable microphone device for converting sound into electronic signals.

The microphone preprocessor is configured to process electronic signals received from the microphone. The microphone preprocessor may include an analog-to-digital converter (ADC) and a noise reduction and echo cancellation circuit (NREC). The ADC converts analog signals from the microphone into digital signal that are then processed by the NREC. The NREC is employed to reduce undesirable audio artifacts for communications and voice control applications. The microphone preprocessor may be implemented using commercially-available hardware, software, firmware, or any suitable combination thereof.

The functionality of the systems, devices, headsets and their respective components, as well as the method steps and blocks described herein may be implemented in hardware, software, firmware, or any suitable combination thereof. The software/firmware may be a program having sets of instructions (e.g., code segments) executable by one or more digital circuits, such as microprocessors, DSPs, embedded controllers, or intellectual property (IP) cores. If implemented in software/firmware, the functions may be stored on or transmitted over as instructions or code on one or more computer-readable media. Computer-readable medium includes both computer storage medium and communication medium, including any medium that facilitates transfer of a computer program from one place to another. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable medium.

Certain embodiments have been described. However, various modifications to these embodiments are possible, and the principles presented herein may be applied to other embodiments as well. For example, the principles disclosed herein may be applied to wired headsets, where the communications link between the headset and an audio source is a wire, rather than a wireless link; or other wireless audio output devices, such as wireless speakers. Also, the methods and apparatuses disclosed herein can be used to download other types of audio executables to audio output devices, such as audio post-processing software/firmware code. In addition, the various components and/or method steps/blocks may be implemented in arrangements other than those specifically disclosed without departing from the scope of the claims.

Other embodiments and modifications will occur readily to those of ordinary skill in the art in view of these teachings. Therefore, the following claims are intended to cover all such embodiments and modifications when viewed in conjunction with the above specification and accompanying drawings.

What is claimed is:

1. A wireless communication device, comprising:
    a first wireless interface configured to communicate with a device over a first wireless network;
    a second wireless interface configured to communicate with a remote server over a second wireless network, the remote server storing one or more executables;
    a controller configured to:
        receive device configuration information from the device over the first wireless network,
        select an executable based on the device configuration information, the executable for configuring the device to process data in a particular format,
        determine whether the selected executable is stored within the wireless communication device, and if not, to retrieve the selected executable from the remote server by way of the second wireless network, and
        download the selected executable to the device over the first wireless network.

2. The wireless communication device of claim 1, wherein the configuration information further includes:
    a configuration indicator configured to indicate one or more processing capabilities of the device.

3. The wireless communication device of claim 1, wherein the device stores a default codec for decoding data, where in the data is encoded audio.

4. The wireless communication device of claim 3, wherein the executable is downloaded to a volatile memory included in the device and the default codec is stored in a non-volatile memory included in the device.

5. An apparatus, comprising:
    a wireless communication device including a first wireless interface for communicating with a second device over a first wireless network and a second wireless interface for communicating with a remote server over a second wireless network, the remote server storing one or more executables, the wireless communication device configured to:
        retrieve second device configuration information from second device over the first wireless network,
        select an executable based on the second device configuration information, the executable for configuring the second device to act on data in a particular format,
        determine whether the selected executable is stored within the wireless communication device, and if not, to retrieve the selected executable from the remote server by way of the second wireless network, and
        download the selected executable to the second device over the first wireless network.

6. The apparatus of claim 5, wherein the second device is configured to receive the executable over the first wireless network.

7. The apparatus of claim 6, wherein the second device is a wireless headset.

8. The apparatus of claim 7, wherein the wireless communication device includes:
    circuitry configured to identify a hardware configuration of the headset; and
    circuitry configured to select the executable based on the hardware configuration.

9. The apparatus of claim 6, wherein the first wireless network is a Bluetooth network.

10. The apparatus of claim 5, wherein the wireless communication device is a cellular phone or a personal digital assistant (PDA).

11. The apparatus of claim 6, wherein the wireless communication device employs a Bluetooth Generic Object Exchange Profile for downloading the executable.

12. An apparatus, comprising:
    means for communicating with a remote server over a first wireless network, the remote server storing one or more executables;
    means for communicating with a second device over a second wireless network,
    means for retrieving the second device configuration information from the second device over the second wireless network;

means for selecting an executable based on the second device configuration information, the executable for configuring the second device to process data in a particular format;

means for determining whether the selected executable is stored locally, and if not, retrieving the selected executable from the remote server by way of the first wireless network; and means for downloading the selected executable to the second device over the second wireless network.

13. The apparatus of claim 12, further comprising:

means for storing the executable at the remote server; and means for retrieving the executable from the storing means and providing the retrieved executable to the downloading means.

14. The apparatus of claim 13, wherein the apparatus is a cellular phone or a personal digital assistant (PDA).

15. The apparatus of claim 13, wherein the downloading means employs a Bluetooth Generic Object Exchange Profile for downloading the executable.

16. The apparatus of claim 13, wherein the downloading means is included, at least in part, in the second device.

17. The apparatus of claim 13, wherein the second device is a headset.

18. The apparatus of claim 17, further comprising:

means for identifying a hardware configuration of the headset; and means for selecting the executable based on the hardware configuration.

19. The apparatus of claim 12, wherein the second wireless network is a Bluetooth network.

20. A method of provisioning a wireless device comprising:

determining whether the wireless device can decode encoded data in a particular format;

if the wireless device can not decode the encoded data in the particular format, determining whether an executable corresponding to the particular format can be downloaded to the wireless device;

if the executable can be downloaded to the wireless device, downloading the executable to the wireless device over a wireless link, the executable configuring the wireless device to decode the encoded data in the particular format; and if the executable can not be downloaded to the wireless device, transcoding, at a source device, the data from the particular format into a second particular format that can be decoded by the wireless device, and streaming the transcoded data from the source device to the wireless device over the wireless link without downloading the executable to the wireless device.

21. The method of claim 20, wherein the wireless link is a Bluetooth link.

22. The method of claim 20, wherein downloading includes:

downloading the executable using a Bluetooth Generic Object Exchange Profile.

23. The method of claim 20, wherein downloading includes downloading the executable from a cellular phone or a personal digital assistant (PDA) to the wireless device.

24. The method of claim 23, further comprising:

identifying a hardware configuration of the wireless device; and selecting the executable based on the hardware configuration.

25. The method of claim 24, further comprising:

transferring the hardware configuration from the wireless device to a wireless communication device.

26. A non-transitory computer-readable medium embodying a set of instructions executable by one or more processors, comprising:

code for:

determining whether the wireless device can decode data in a particular format, if the wireless device can not decode the data in the particular format, determining whether an executable corresponding to the particular format can be downloaded to the wireless device, if the executable can be downloaded to the wireless device, downloading the executable to the wireless device over a wireless link, the executable configuring the wireless device to decode the data in the particular format, and if the executable can not be downloaded to the wireless device, transcoding, at a wireless source, the audio from the particular format into a second particular format that can be decoded by the wireless device, and streaming the transcoded audio from the source device to the wireless device over the wireless link without downloading the executable to the wireless device.

27. The computer-readable medium of claim 26, wherein the wireless link is a Bluetooth link.

28. The computer-readable medium of claim 26, wherein the downloading code includes code for downloading the executable from a cellular phone or a personal digital assistant (PDA) to the wireless device.

29. The computer-readable medium of claim 26, wherein downloading code includes:

code for downloading the executable using a Bluetooth Generic Object Exchange Profile.

30. The computer-readable medium of claim 26, further comprising:

code for identifying a hardware configuration of the wireless device, and code for selecting the executable based on the hardware configuration.

31. The computer-readable medium of claim 30, further comprising:

code for transferring the hardware configuration from the wireless communication device.

* * * * *